March 31, 1936.  W. B. POPE  2,035,980
PLANT TRANSPLANTER
Filed Feb. 1, 1935  2 Sheets-Sheet 1
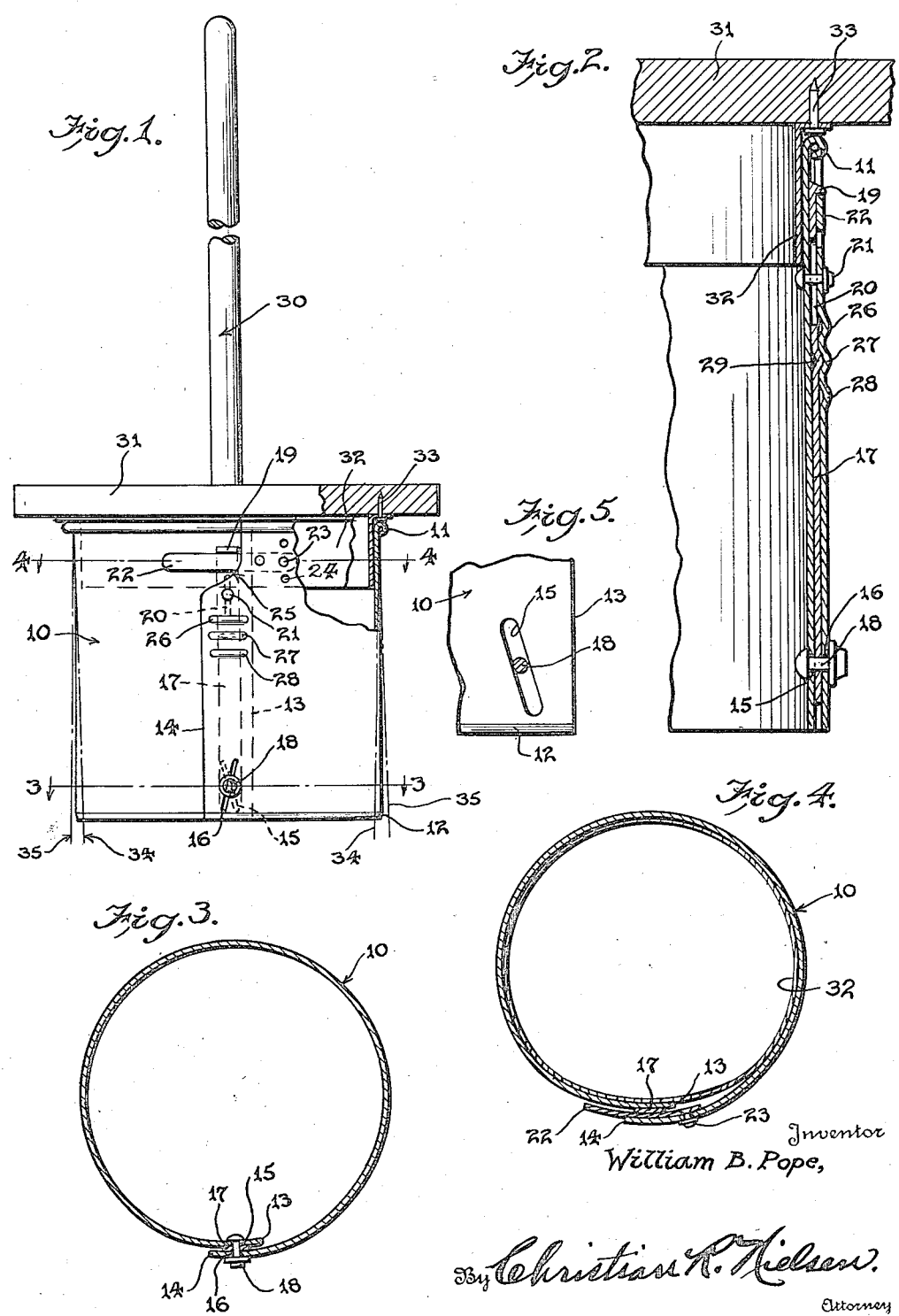
Inventor
William B. Pope,
By Christian R. Nielsen.
Attorney March 31, 1936.  W. B. POPE  2,035,980
PLANT TRANSPLANTER
Filed Feb. 1, 1935   2 Sheets-Sheet 2
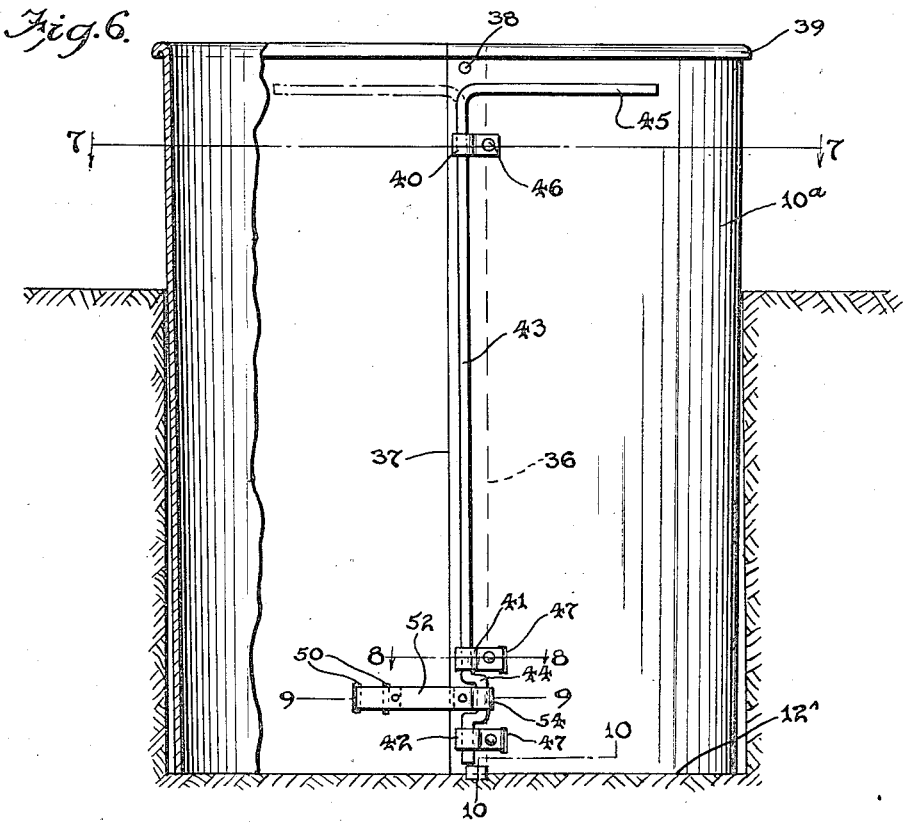
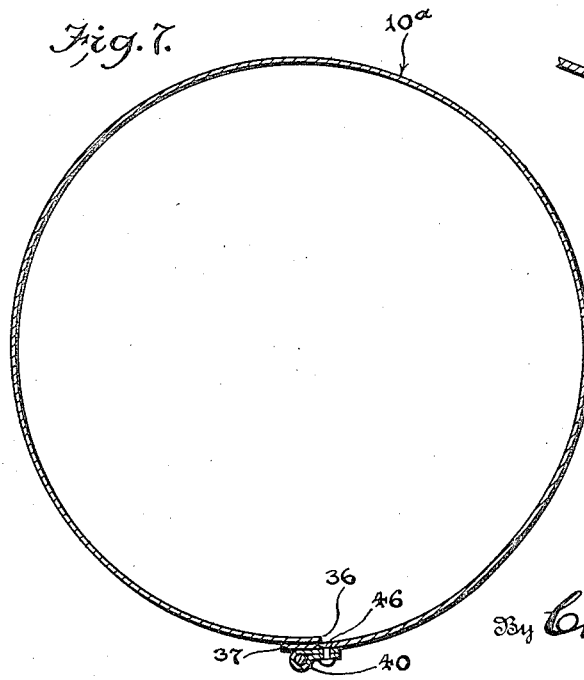
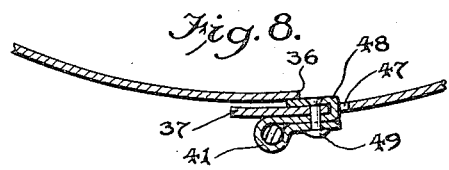
Inventor
William B. Pope,
By Christian K. Nielsen,
Attorney Patented Mar. 31, 1936

2,035,980

UNITED STATES PATENT OFFICE 2,035,980

PLANT TRANSPLANTER

William B. Pope, Drewryville, Va.

Application February 1, 1935, Serial No. 4,542

8 Claims. (Cl. 55—119)

My invention relates to transplanters of a type which may be readily employed in the removal of young plants from hot-beds, preliminary to the setting of the plants in the fields and it consists in the constructions, arrangements and combinations herein described and claimed.

It is a cardinal purpose of the invention to provide a contractible spade member of such structure as to encompass earth surrounding the plant, and retain the earth within the spade, without disturbance to the roots of the plant, as well as providing means for expanding the spade to permit removal of the earth and plant.

It is also an object of the invention to provide a contractible spade which may be expanded or contracted to maintain three distinct positions, namely "digging position", "carrying position" and "releasing position", the movement of the spade to assume these positions being effected through manipulation of a simple lever.

It is a still further object of the invention to provide a handle member which is detachable from the spade element, thereby permitting the handle to be employed with different spade units, as desired.

It is also an object of the invention to provide a transplanter of the character described which is simple in operation, cheap to manufacture, and of relatively few moving parts.

Additional objects, advantages and features of invention will be apparent from the following description, considered in conjunction with the accompanying drawings, wherein Figure 1 is a side elevational view, partly in section, illustrating my transplanter.

Figure 2 is an enlarged vertical sectional view thereof.

Figure 3 is a cross section on the line 3—3 of Figure 1.

Figure 4 is a cross section on the line 4—4 of Figure 1.

Figure 5 is an enlarged detail view of a portion of the spade, illustrating one of the slots employed in contracting and expanding the spade body.

Figure 6 is an elevational view, partly in section, illustrating a modification of the form shown in Figure 1.

Figure 7 is a cross section on the line 7—7 of Figure 6.

Figure 8 is an enlarged cross section on the line 8—8 of Figure 6.

Figure 9 is an enlarged cross section on the line 9—9 of Figure 6.

Figure 10 is a similar view on the line 10—10 of Figure 6.

Attention is now directed to Figures 1 to 5 of the drawings, wherein there is illustrated a substantially circular spade element 10, which may have any desired dimensions, and which may be formed from any suitable material possessing the necessary resilience. While I have specified the spade element as being of circular formation, this is merely illustrative, as obviously the spade may have other formations and still function in a manner similar to a circular element.

The spade 10 is open upon its ends, the upper end preferably having a rolled edge 11 and the lower edge 12 may be slightly beveled to provide a cutting edge, if desired.

As clearly shown in Figures 3 and 4, the body of the spade element does not define a true circle, the vertical edges 13 and 14 being arranged in an overlapped relation. Spaced inwardly a short distance from respective edges 13 and 14 and adjacent the edge 12 of the spade there are respective slots 15 and 16. The slots 15 and 16 are formed at an angle to each other but intersect each other, in normal position, at approximately their medial portions.

Between the edges 13 and 14 a slide bar 17 is positioned, spacing the edges of the spade from contacting relation with one another, and a rivet 18 is fixed in the bar, the opposite end portions of which are disposed within the slots 15—16. The lower end of the bar stops short of the edge 12 of the spade and the upper end terminates in a bill portion 19, which normally occupies a position spaced below the rolled edge 11. The bar 17 has a longitudinally extended slot 20, and a rivet 21 secured in overlapped portions of the spade, is disposed through the slot.

A lever 22 is pivoted to the body of the spade, as at 23, extending circumferentially therearound for a short distance and is located beneath the bill portion 19. Additional apertures 24 vertically spaced are provided, permitting the lever 22 to be pivotally mounted in any one of the apertures, to increase or decrease the longitudinal movement of the bar 17.

The bill 19 is extended at right angles with respect to the bar 17 and receives the lever 22 therebeneath, as stated above and the edge 14 of the spade is cut away as at 25, to accommodate the bill, as clearly seen in Figure 1.

Adjacent the edge 14 of the spade and intermediate the height thereof, three horizontally extended cavities 26, 27, and 28 are formed, and the bar 17 is formed with a rib 29 of a size to be selectively engaged in the cavities upon movement of the bar 17 as will be presently explained.

In order to readily manipulate the spade 10, a handle generally indicated at 30 is provided, which includes a base 31 of any desired shape, but of a size substantially larger than the spade. Upon the under side of the base, a cylindrical sleeve 32 is secured, as at 33, the sleeve being of a size to frictionally engage within the upper end of the spade, and of a length to extend a substantial distance into the spade.

In use, the spade 10 is positioned around the plant which it is desired to transplant, the parts being in the solid line position shown in Figure 1. Foot pressure is placed upon the base 31, forcing the edge 12 downwardly into the earth. At this stage of operation the bar 17 is positioned so that the rib 29 is engaged with the cavity 27, and in order to cause contraction of the bottom of the spade to retain the earth and plant therein the bar 17 is moved downwardly, until the rib 29 is seated in the cavity 28. Downward movement of the bar, will likewise move the pin 18 in the same direction and since this pin is extended through the oppositely inclined slots 15—16, such movement of the pin will cause the lower edge of the spade to contract, to the position indicated at 34. The spade is then withdrawn from the ground with the plant securely retained within the spade. It will be understood that by virtue of engagement between the rib 29 and the cavity 28, the spade will be maintained against accidental expansion, yet upon positive actuation of the bar in the opposite direction the spade is readily expandible, for release of the plant and surrounding earth.

Obviously, upon an upward lift of the handle 30, the spade is removed from a hot-bed and the earth and plant may be released upon movement of the lever 22 in an upward direction. Upward movement of the lever 22 it will be noted causes engagement with the bill 19 and such movement is continued until the rib 29 seats in the cavity 26. In this position of the parts, the lower portion of the spade has been expanded to the position indicated by the dotted lines 35, thereby releasing the earth and plant. After release of the plant, the bar 17 is restored to position the rib 29 in the cavity 27, when the spade is again in "digging position" for further transplanting operations.

In Figures 6 to 10, I have illustrated a modification of the structure shown in Figures 1—5. In the modification, there is shown a substantially circular spade 10a longitudinally divided, the edges 36—37 of which are in overlapped relation. A rivet 38 is engaged through the overlapped portions of the spade, adjacent its upper rolled edge 39. The rivet 38 secures the edges against separation, yet permits the necessary pivotal action during expansion and contraction of the spade.

Three bearings 40, 41 and 42 are provided adjacent the edge 37 of the spade, arranged in vertical alignment, and journal a shaft 43. The bearings 41 and 42, as shown, are positioned adjacent the lower edge of the spade, in paired relation, while the bearing 40 is located at an upper portion of the spade. The shaft 43 has a crank 44, formed in the shaft so as to be disposed between the bearings 41 and 42, and the upper portion of the shaft terminates in an operating handle 45. The handle 45 preferably has a curvature corresponding to the outer surface of the spade, so that it may be swung into snug engagement therewith.

The bearings 40, 41, and 42 may be of any desired construction, but in the present instance, the bearing 40 is shown as formed from a simple blank of sheet metal bent intermediate its length to form the circular bearing, and the end portions lying flush with one another are secured to the spade body by a single rivet 46.

In order to prevent binding action between the shaft and bearings 41—42, these bearings must be held positively against lateral movements, and therefore the spade body is slotted as at 47, and one leaf 48 of the bearing is made somewhat longer and is extended through the slot. The leaf 48 is then bent so as to snugly engage the inner side of the spade body, as shown in Figure 8. The leaves of the bearing and the body of the spade are apertured to receive a rivet 49. The slots 47 are only slightly wider than the leaves of the bearings, thereby, in conjunction with the rivet, movement of the bearings is prevented.

Rearwardly of the edge 36 of the spade, a pair of spaced slots 50 are formed through which a leg 51 of a crank link 52 is threaded, as clearly shown in Figure 10. The leg 51 is bent to lie flush with the outer surface of the spade body, and the inner face of the link 52, and a rivet 53 secures the spade body, the leg and link together. The opposite end of the link is provided with a bearing eyelet 54 for securement to the crank 44 of the shaft. In order that the lower edge 12' of the spade may be properly guided during expanding and contracting operations, the edge 36 is made slightly longer than the edge 37, providing a tongue. This tongue is bent upwardly as at 55 to lie in a plane parallel with the edge 36, defining a guide channel for the overlapped edge 37.

In use, it will be apparent that upon actuation of the handle 45, the lower edge 12' will be caused to contract and expand by virtue of the crank 44 and its connection with the link 52. When inserting the spade into the ground, the handle would have a position indicated by dotted lines, the spade being in expanded position, and upon contraction of the spade body, as shown in full lines in Figure 6, the transplanter may be readily removed from the earth.

While I have not shown the handle 30 associated with figures illustrating the modification, it will be understood, of course that the handle will be employed.

From the foregoing, it will be readily seen that I have provided a transplanter which is highly efficient in use and one in which the roots of a plant, to be transplanted, are not disturbed, and further that sufficient ground in which the plant was originally sowed is retained with the plant to insure its continued growth, after transplanting.

While I have shown and described preferred constructions of my invention I am aware that variations thereof may be made, and I therefore consider as my own all such modifications as fairly fall within the scope of the appended claims.

I claim:—

1. A transplanter comprising a spade member constructed for insertion in the ground surrounding a plant to be removed, said spade having overlapping vertical edges, means for contracting and expanding one end portion of the spade, and means for locking the vertical edges of the spade in predetermined positions.

2. A transplanter comprising a spade member constructed for insertion in the ground surrounding a plant to be removed, said spade having overlapping vertical edges, means for contracting and expanding one end portion of the spade, means for locking the vertical edges of the spade in predetermined positions, and detachable handle means associated with the spade.

3. In a transplanter, a circumscribing spade member having overlapping portions, a bar member movably mounted between the overlapping portions, each of said overlapping portions having slots formed therein adjacent one end of the spade member, the slots in respective portions being oppositely inclined, a rivet carried by the bar and engaged in respective slots, an elongated slot formed in the bar, a pin fixed to the overlapped portions of the spade and movable through the slot, means for moving the bar, and means between one of the overlapped portions and the bar for holding the overlapped portions of the spade in predetermined positions.

4. In a transplanter, a circumscribing spade member having overlapping portions, a bar member movably mounted between the overlapping portions, each of said overlapping portions having slots formed therein adjacent one end of the spade member, the slots in respective portions being oppositely inclined, a rivet carried by the bar and engaged in respective slots, an elongated slot formed in the bar, a pin fixed to the overlapped portions of the spade and movable through the slot, means for moving the bar, means between one of the overlapped portions and the bar for holding the overlapped portions of the spade in predetermined positions, and detachable handle means associated with the spade.

5. In a transplanter, a circumscribing spade member having overlapping portions, a bar member movably mounted between the overlapping portions, each of said overlapping portions having slots formed therein adjacent one end of the spade member, the slots in respective portions being oppositely inclined, a rivet carried by the bar and engaged in respective slots, an elongated slot formed in the bar, a pin fixed to the overlapped portions of the spade and movable through the slot, means for moving the bar, one of said overlapped portions having a series of spaced cavities and a rib formed on the bar for selective engagement with one of the cavities whereby to lock the overlapped portions in a predetermined position.

6. In a transplanter, a circumscribing open ended spade member, a handle member therefor, said handle including a base having a portion frictionally engaged within one open end of the spade member.

7. In a transplanter, a circumscribing spade member having overlapping portions, a link member connected to one of the overlapping portions, crank means on the other overlapping portion and operatively associated with the link member, means for actuating the crank, and handle means for the spade member.

8. In a transplanter, a circumscribing spade member having open ends and vertical overlapping portions, an oscillatable shaft mounted on one of the overlapped portions, said shaft having a crank adjacent one of the open ends, a lever connected to the crank and the other of the overlapped portions, whereby to contract or expand the spade at one end upon actuation of the shaft, and handle means engageable with the other end of the spade member.

WILLIAM B. POPE.